(12) United States Patent  
Chang et al.

(10) Patent No.: US 7,957,048 B2
(45) Date of Patent: Jun. 7, 2011

(54) DISPLAY DEVICE AND METHOD OF MANUFACTURING THE SAME

(75) Inventors: Jae-Hyuk Chang, Gyeonggi-do (KR); Seong-Sik Shin, Gyeonggi-do (KR); Nam-Seok Roh, Gyeonggi-do (KR); Jun-Bo Yoon, Daejeon (KR); Kyung-Ho Lee, Daejeon (KR)

(73) Assignees: Samsung Electronics Co., Ltd. (KR); Korea Advanced Institute of Science and Technology (KR)

( * ) Notice: Subject to any disclaimer, the term of this patent is extended or adjusted under 35 U.S.C. 154(b) by 178 days.

(21) Appl. No.: 11/834,092

(22) Filed: Aug. 6, 2007

(65) Prior Publication Data

US 2008/0030828 A1    Feb. 7, 2008

(30) Foreign Application Priority Data

Aug. 7, 2006    (KR) .................. 10-2006-0074304

(51) Int. Cl.
*G02F 1/03*    (2006.01)
*G02F 1/155*    (2006.01)
*G02B 26/00*    (2006.01)

(52) U.S. Cl. .................. 359/254; 359/266; 359/290
(58) Field of Classification Search .................. 359/254, 359/237, 242, 290–298, 266
See application file for complete search history.

(56) References Cited

U.S. PATENT DOCUMENTS

| 6,137,623 | A | 10/2000 | Roberson et al. |
| 6,987,603 | B2 * | 1/2006 | Paolini et al. .................. 359/296 |
| 2004/0001033 | A1 * | 1/2004 | Goodwin-Johansson et al. .................. 345/31 |
| 2006/0152646 | A1 | 7/2006 | Schrader |
| 2007/0279558 | A1 * | 12/2007 | Chang .................. 349/113 |
| 2008/0259226 | A1 * | 10/2008 | Broer et al. .................. 349/1 |

FOREIGN PATENT DOCUMENTS

| JP | 07092340 | 4/1995 |
| JP | 07092341 | 4/1995 |
| JP | 2000321291 | 11/2000 |
| JP | 2001147654 | 5/2001 |
| JP | 2002006239 | 1/2002 |
| JP | 2002062246 | 2/2002 |
| JP | 2003035875 | 2/2003 |
| JP | 2005326542 | 11/2005 |
| KR | 1019980014717 | 5/1998 |
| KR | 1019990043704 | 6/1999 |
| KR | 100366342 | 12/2002 |
| KR | 100424817 | 3/2004 |
| KR | 1020060004590 | 1/2006 |
| KR | 1020060022061 | 3/2006 |
| WO | 2005049481 | 6/2005 |

* cited by examiner

*Primary Examiner* — Ricky Mack
*Assistant Examiner* — Dawayne A Pinkney
(74) *Attorney, Agent, or Firm* — Cantor Colburn LLP

(57) ABSTRACT

A display device includes an upper substrate and a lower substrate. Black matrixes are formed upon the upper substrate and color filters are formed between the black matrixes. Microshutter electrodes are formed upon the lower substrate and are configured to open and close. The display device also includes fixed electrodes formed in a vertical direction between the upper substrate and the lower substrate.

15 Claims, 21 Drawing Sheets

DISPLAY DEVICE AND METHOD OF MANUFACTURING THE SAME

This application claims priority to Korean Patent Application No. 10-2006-0074304, filed on Aug. 7, 2006, and all the benefits accruing therefrom under 35 U.S.C. §119, the contents of which are incorporated herein by reference in its entirety.

BACKGROUND OF THE INVENTION (a) Field of the Invention

The present invention relates to a display device and method of manufacturing the same. In particular, the present invention relates to a display device including a microshutter electrode, and a method of manufacturing the same.

(b) Description of the Related Art

Display devices have progressed from known cathode ray tube ("CRT") displays to flat panel displays, such as liquid crystal displays ("LCD"s), plasma display panels ("PDP"s), and the like. A CRT display displays an image by causing an electron beam to collide with a fluorescent material. The CRT display has a drawback in that as the size of the CRT display increases, the depth thereof also increases, and thus it is difficult to increase the size of the display device without adding bulk and weight to the device.

In order to overcome the drawback, various types of flat panel displays are being developed. The LCDs and PDPs are the most common examples of the flat panel displays. The flat panel displays, such as the LCDs and PDPs, have an advantage over the CRTs, in that even when the size thereof increases, the depth thereof does not increase, rendering the flat panel displays more suitable for mounting on a wall.

However, the LCDs are known to have a low response speed, and the PDPs have high power consumption.

Further, since the LCDs have polarizers formed on upper and lower parts, approximately 50% of the light is not used to display an image, resulting in the LCDs having low luminance.

BRIEF SUMMARY OF THE INVENTION

The present invention has been made in an effort to provide a display device that uses a microshutter electrode that is opened and closed in a vertical direction, and a method of manufacturing the same.

To this end, in the exemplary embodiments of the present invention, microshutter electrodes and fixed electrodes are used, and the microshutter electrodes are opened and closed in a vertical direction.

An exemplary embodiment of the present invention provides a display device which includes an upper substrate, black matrixes formed upon the upper substrate, color filters formed between the black matrixes, a lower substrate, microshutter electrodes formed upon the lower substrate, the microshutter electrodes configured to open and close, and fixed electrodes formed in a vertical direction between the upper substrate and the lower substrate.

The fixed electrodes may support the upper substrate and the lower substrate, and may be formed in a region that is covered with the black matrixes.

Two microshutter electrodes may be symmetrically formed in one pixel and have a curved shape.

The two microshutter electrodes may be arranged in a vertical direction to allow transmission of light from a light source to the upper substrate.

The two microshutter electrodes may be in contact with each other to block the transmission of light from the light source to the upper substrate.

The two microshutter electrodes may overlap each other such that light cannot be transmitted.

Each of the microshutter electrodes extend upward from the lower substrate and curve at end portions thereof to face each other may be formed to be curved in an upward direction.

The fixed electrodes may be formed on the black matrixes of the upper substrate and not be in contact with the lower substrate.

The display device may further include a backlight unit that supplies light.

The lower substrate may be formed in a lens shape on a lower surface thereof.

The lens shapes may be formed by cutting cylinders and arranging them in a direction in which the fixed electrodes are arranged.

Another exemplary embodiment of the present invention provides a method of manufacturing a display device, the method including forming a polymer on the first substrate, etching the polymer to form a square polymer pattern, heating the square polymer pattern and performing a reflow process to form the square polymer pattern into a polymer pattern having a round shape, depositing metal over the first substrate and the polymer pattern having a round shape and etching the deposited metal to form microshutter electrodes, selectively removing the polymer pattern having a round shape, forming black matrixes on a second substrate that faces the first substrate, forming color filters between the black matrixes, and coupling the first substrate and the second substrate to each other.

The method may further include forming fixed electrodes on the first substrate or the second substrate that faces the first substrate.

The fixed electrodes may be arranged to be located in a region that is covered with the black matrixes.

BRIEF DESCRIPTION OF THE DRAWINGS

The above and other aspects, features and advantages of the present invention will become more apparent by describing in further detail exemplary embodiments thereof with respect to the accompanying drawings, in which.

DETAILED DESCRIPTION OF THE INVENTION

Figure 1:
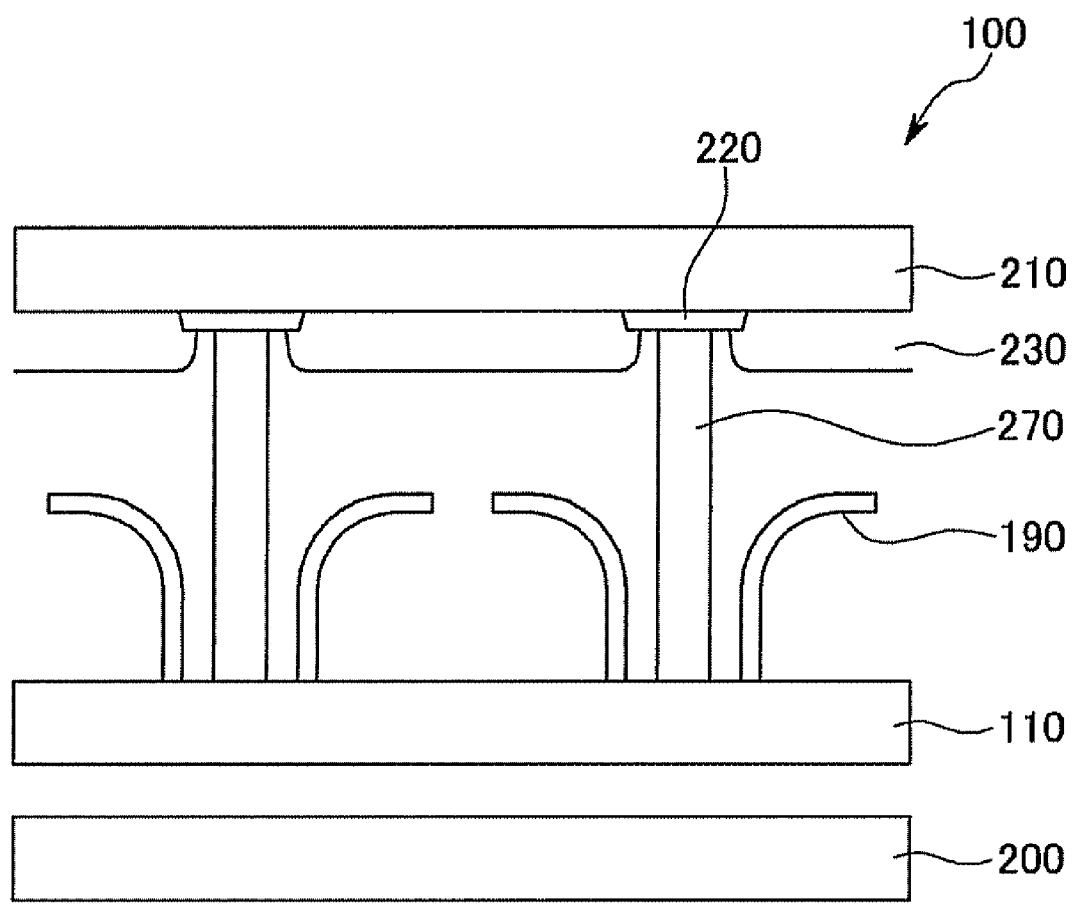
FIG. 1 is a cross-sectional view illustrating a display device according to a first exemplary embodiment the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described, as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

A display device according to an exemplary embodiment of the present invention will be described in detail with reference to FIG. 1.

FIG. 1 is a cross-sectional view illustrating a first exemplary embodiment of a display device 100 according to the present invention.

The display device 100 includes a display panel having, an upper substrate 210, and a lower substrate 110, and also includes a backlight unit 200 is located below the display panel.

The backlight unit 200 is a constituent element for supplying light to the display panel, and includes a light source (not shown), a reflector (not shown), and a film (not shown).

The display panel displays an image by blocking or transmitting light that is supplied from the backlight unit 200. The display panel includes back matrixes 220, color filters 230, fixed electrodes 270, and microshutter electrodes 190. The display panel adjusts an amount of transmitted light by microshutter electrodes 190.

As shown in FIG. 1, the lower substrateupper substrate-lower substrate 110 and the upper substrate 210 surround the display panel. The black matrixes 220, color filters 230, fixed electrodes 270, and the microshutter electrodes 190 are formed between the upper and lower substrates 110 and 210.

The upper substrate 210 and the lower substrate 110 may be made of glass or the like, and transmit light. The fixed electrodes 270 may be formed in a pillar shape along the sides of pixels that are units for displaying an image. The unit pixels may be defined by gate lines and data lines (not shown) within a display panel for the display device of the present invention. In one exemplary embodiment, the fixed electrodes 270 are formed along a side of the pixels perpendicular to the cross sectional side shown. A voltage is applied to the fixed electrodes 270, and the voltage may remain constant. In the display panel according to the present exemplary embodiment, the fixed electrodes 270 may also serve as spacers to help maintain a predetermined space (and provide support) between the upper substrate 210 and the lower substrate 110.

The microshutter electrodes 190 may have a single-layer structure that is formed of an opaque metal. Further, the microshutter electrodes 190 may be formed of a plurality of layers. In one exemplary embodiment, at least one layer among the plurality of layers may be formed of a metallic material that does not transmit light. First ends of the microshutter electrodes 190 are disposed on the lower substrate 110 and extend upward therefrom and may curve at respective opposing ends. A pair of microshutter electrodes 190 may be formed in one pixel. The microshutter electrodes 190 and the fixed electrodes 270 are electrically separated from each other. As shown in FIG. 1, the microshutter electrodes 190 and the fixed electrodes 270 are formed with predetermined intervals therebetween. Various voltages may be applied to the microshutter electrodes 190. According to applied voltages, an electrical attractive force or repulsive force is applied between the microshutter electrodes 190 and the fixed electrodes 270, which opens and closes the microshutter electrodes 190. In this manner, the amount of transmitted light is adjusted. This will be described below.

Though not shown in FIG. 1, wiring lines are formed on the lower substrate 110 or the upper substrate 210 so as to apply signals to the fixed electrodes 270 and the microshutter electrodes 190. In particular, a voltage is applied to the microshutter electrodes 190 through the lower substrate 110. Switching elements (not shown) enable the application of the voltage to microshutter electrodes 190. In particular, switching elements are only opened with respect to a row that is selected according to gate signals transmitted through gate lines, data lines, and the switching elements, data signals may flow through the microshutter electrodes 190.

The black matrix 220 formed on the upper substrate 210 prevents light from radiating upward except for light that is used to display an image. Predetermined intervals lie between the fixed electrodes 270 and the microshutter electrodes 190, and light radiated between the intervals is not blocked by the microshutter electrodes, but is always transmitted. Thus configured, the black matrix 220 blocks the light at a corresponding location below the upper substrate 210.

The color filters 230 are formed between the black matrixes 220. The color filters 230 add color to light that is supplied by the backlight unit 200. In general, red, green, and blue color filters 230 are used.

Figure 2:
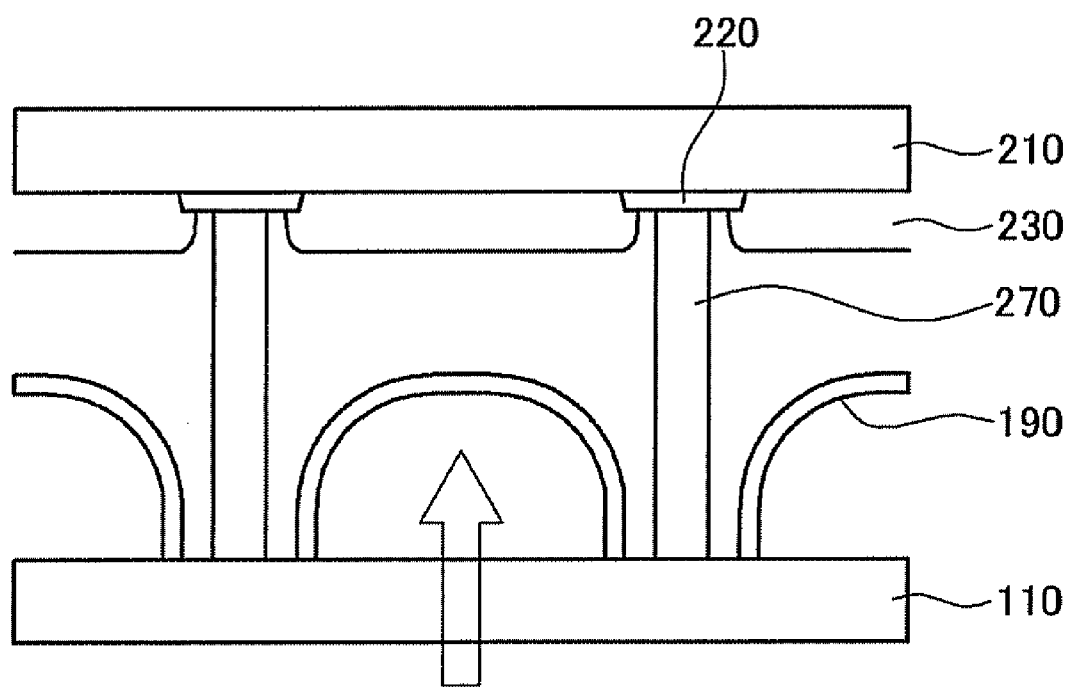
FIG. 2 is a cross sectional view showing the display device according to the first exemplary embodiment of the present invention performs a black display.
Figure 3:
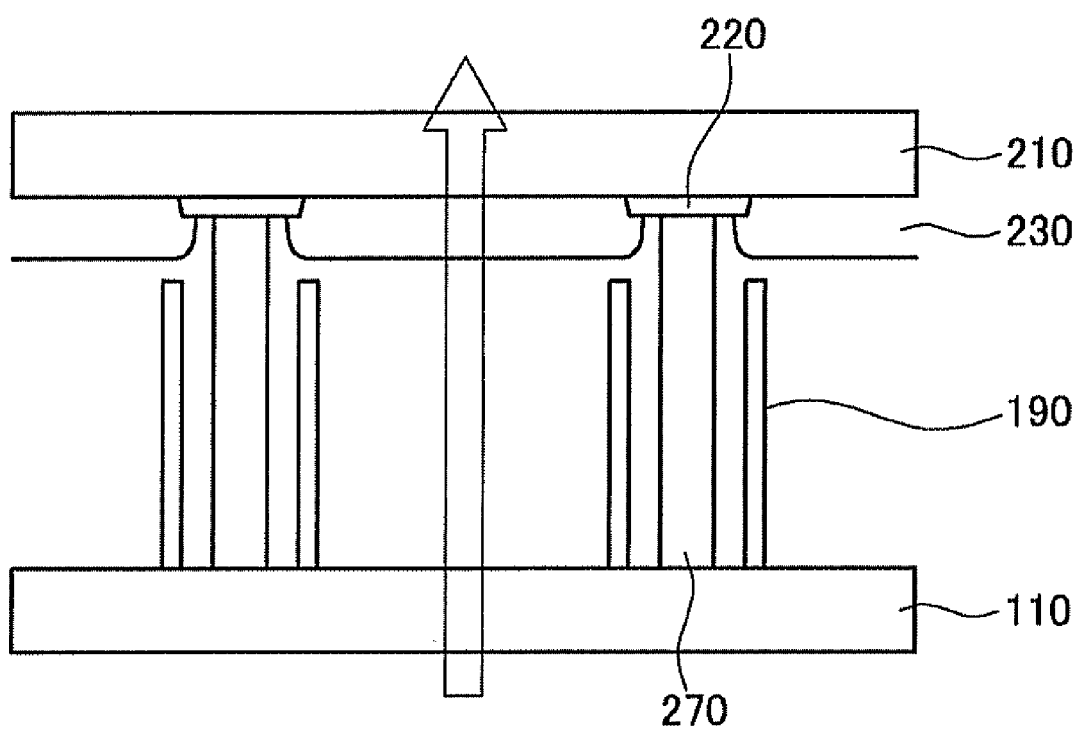
FIG. 3 is a cross sectional view showing the display device according to the first exemplary embodiment of the present invention that allows the transmission of light.

FIG. 2 is a view showing a first exemplary embodiment of a display device according to the present invention that blocks the transmission of light, and FIG. 3 is a view showing a first exemplary embodiment of a display device according to the present invention that allows the transmission of light.

FIGS. 2 and 3 also illustrate an exemplary method by which a display device according to the present invention that performs the black display by blocking the transmission of light and the white display that allows the transmission of light.

As shown in FIG. 2, as two microshutter electrodes 190 formed in one pixel (not shown) are spaced from the fixed electrodes 270 due to a weak attractive force therebetween, the microshutter electrodes 190 come in contact with each other to thereby block light that radiates from below. As shown in FIG. 2, as a method of blocking light, it is preferable that both microshutter electrodes 190 be in contact with each other. However, according to another exemplary embodiment, the microshutter electrodes 190 may overlap each other. When the microshutter electrodes 190 overlap each other, light may pass through the lower microshutter electrodes 190 but the light is eventually blocked by the upper microshutter electrodes 190 formed above the lower microshutter electrodes 190.

As shown in FIG. 3, when two microshutter electrodes 190 formed in one pixel are arranged in a vertical direction due to a strong attractive force between the microshutter electrodes 190 and the fixed electrodes 270, light, which is supplied from below, completely passes through such that the display device performs the white display.

When the microshutter electrodes 190 are opened at an intermediate level between FIGS. 2 and 3, intermediate luminance between white and black is obtained. Grayscale display may be performed according to a degree to which the microshutter electrodes 190 are opened and closed.

Hereinafter, a method of manufacturing a display device according to an exemplary embodiment of the present invention will be described.

FIGS. 4 to 7 are views sequentially illustrating an exemplary a method of manufacturing a lower substrate of a display device according to the present invention.

Figure 4:
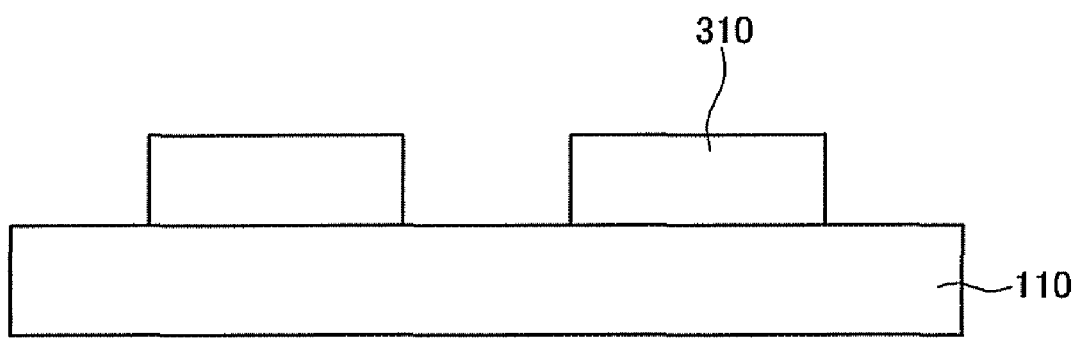
FIGS. 4 to 7 are sequential cross sectional views illustrating an exemplary method of manufacturing a lower substrate of a display device according to the present invention.
Figure 5:
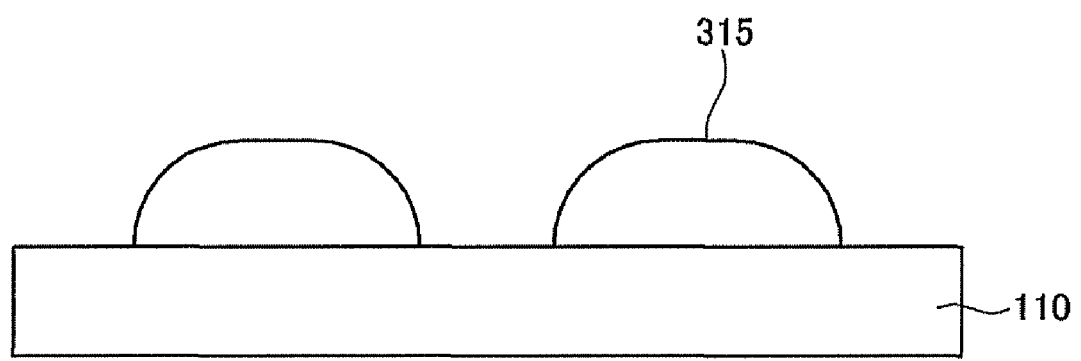
Figure 6:
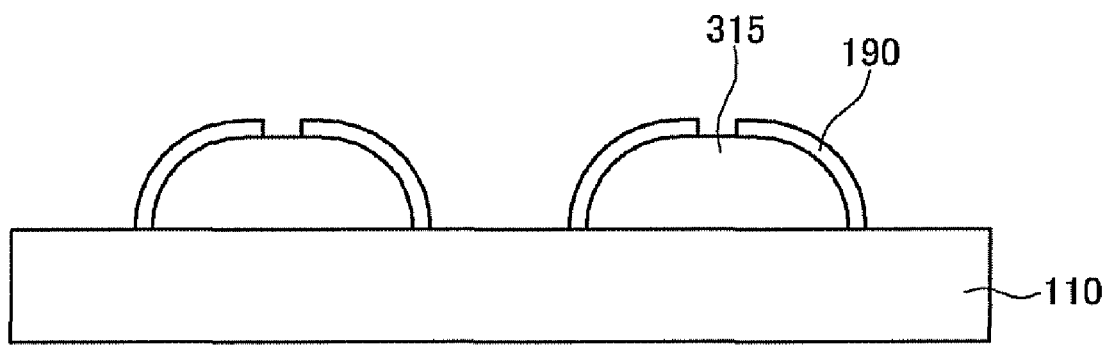
Figure 7:
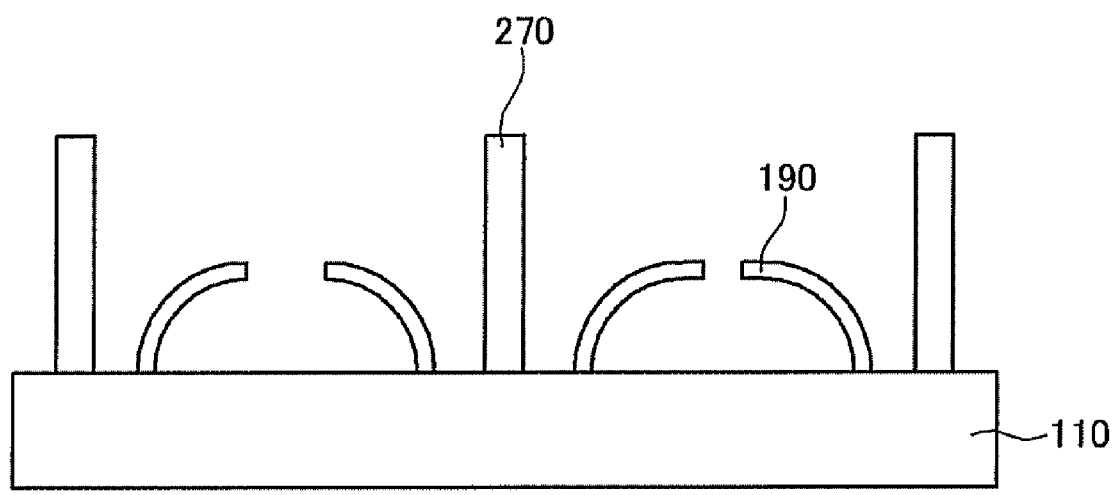

A polymer 310 is formed on a lower substrate 110 and then patterned into a predetermined shape (see FIG. 4). While heat is applied to the polymer 310, a reflow process is performed so that the polymer 310 having a square shape is reformed into a polymer 315 having a round shape (see FIG. 5). An opaque metal layer is formed and then etched to the lower substrate 110 forming microshutter electrodes 190 (see FIG. 6). Fixed electrodes 270 are formed by using metal, and only the polymer 315 is selectively removed, thereby completing the lower substrate 110 (see FIG. 7). The fixed electrodes 270 may be formed after the polymer 315 is removed. Since the polymer 315 has a different property from the metal (microshutter electrodes 190 and fixed electrodes 270), the polymer 315 can be selectively removed.

Though not shown in the drawings, wiring lines for applying signals to the fixed electrodes 270 and the microshutter electrodes 190 are formed on the lower substrate 110, and it is preferable that the wiring lines be previously formed on the lower substrate 110 before a process shown in FIG. 4.

Hereinafter, a method of manufacturing an upper substrate will be described.

Figure 8:
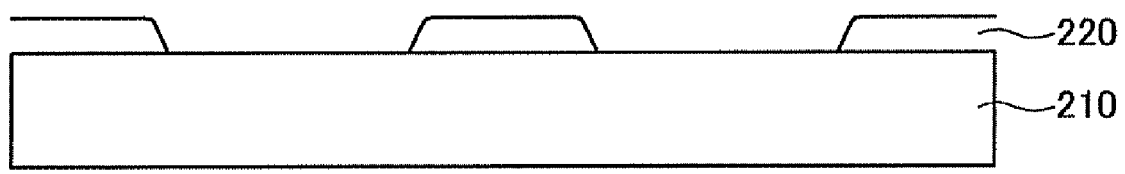
FIGS. 8 and 9 are sequential cross sectional views illustrating an exemplary method of manufacturing an upper substrate of a display device according to the present invention.
Figure 9:
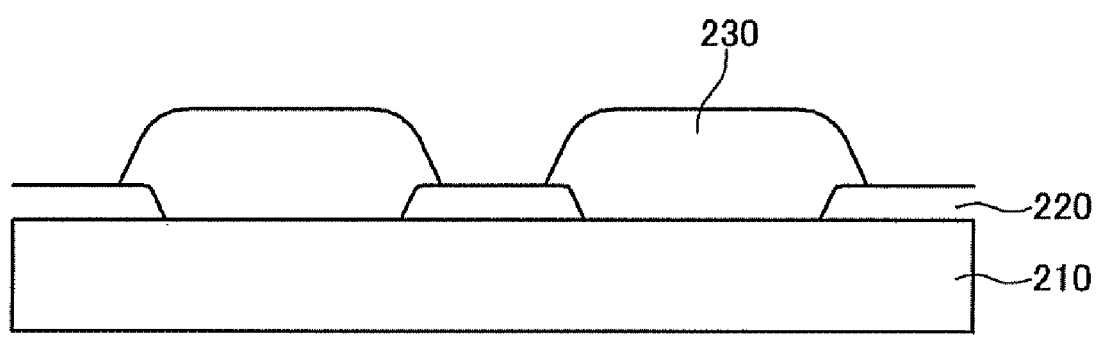

FIGS. 8 and 9 are views sequentially illustrating an exemplary method of manufacturing an upper substrate of a display device according to the present invention.

A material capable of blocking light (e.g., chromium or the like) is deposited on the upper substrate 210 and etched to the upper substrate 210 thereby forming black matrixes 220 (see FIG. 8). Then, color filters 230 are formed between the black matrixes (see FIG. 9). It is preferable that the color filters 230 be formed by different processes according to each color. The color filters having the same color may be formed in a column.

Figure 10:
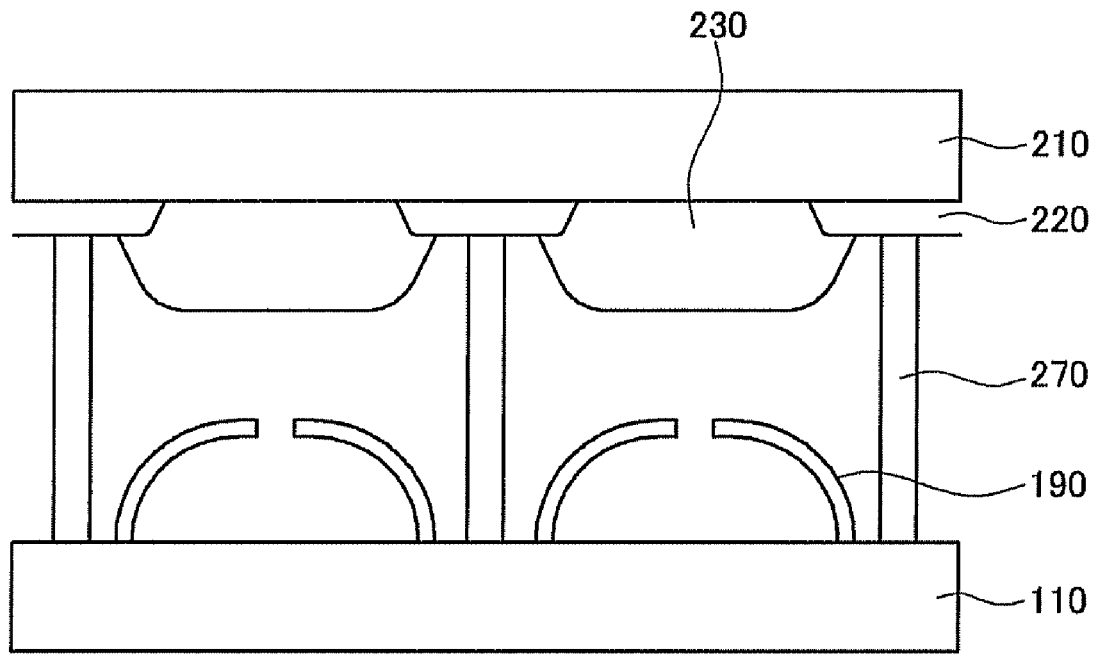
FIG. 10 is a cross sectional view showing an exemplary embodiment in which a lower substrate manufactured by processes shown in FIGS. 4 to 7 and an upper substrate manufactured by processes shown in FIGS. 8 and 9 are coupled to each other.

FIG. 10 is a view illustrating an exemplary embodiment in which a lower substrate manufactured by processes shown in FIGS. 4 to 7 and an upper substrate manufactured by processes shown in FIGS. 8 to 9 are coupled to each other.

When the lower substrate 110 manufactured by the processes shown in FIGS. 4 to 7 and the upper substrate 210 manufactured by the processes shown in FIGS. 8 to 9 are coupled to each other, a display panel is completed, as shown in FIG. 10.

Hereinafter, another exemplary method of manufacturing a display panel of a display device according to the present invention by using a different method from that in FIGS. 4 to 10 will be described.

FIGS. 11 to 14 are views sequentially illustrating a method of manufacturing a lower substrate of a display device according to another exemplary embodiment of the present invention.

Figure 11:
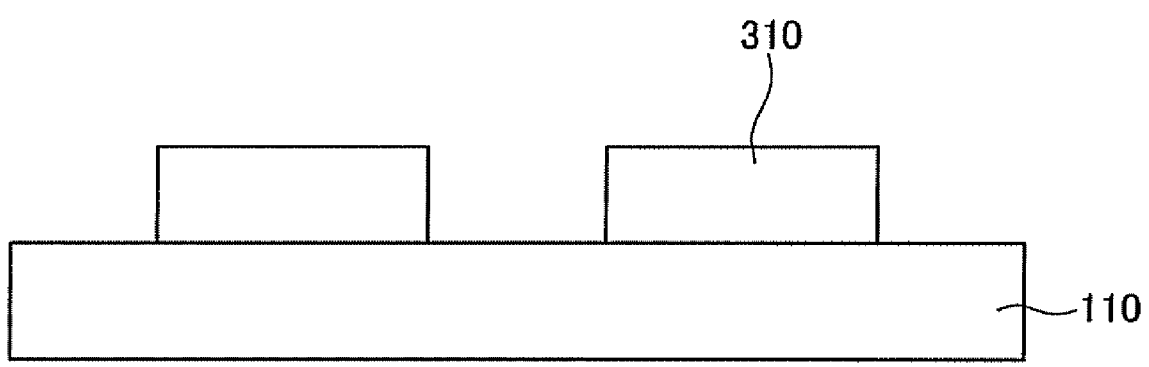
FIGS. 11 to 14 are sequential cross sectional views illustrating another exemplary method of manufacturing a lower substrate of a display device according to the present invention.
Figure 12:
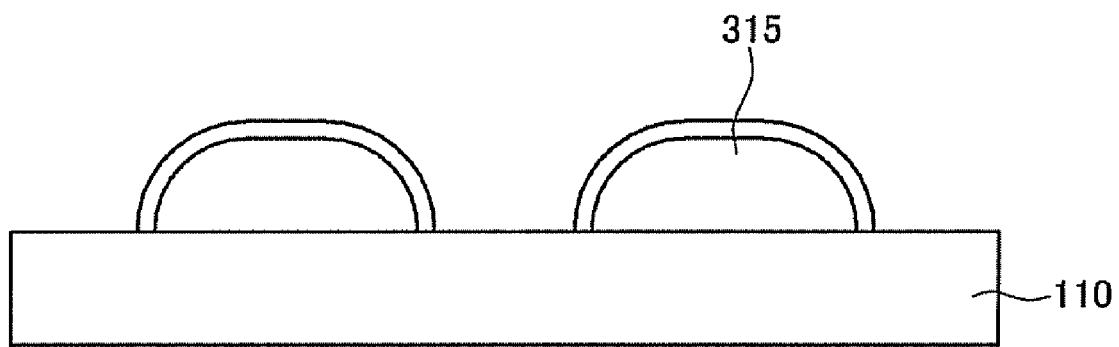
Figure 13:
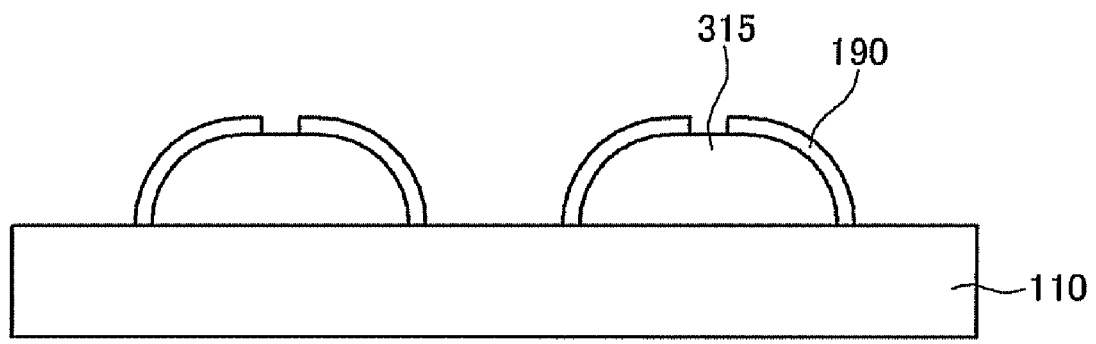
Figure 14:
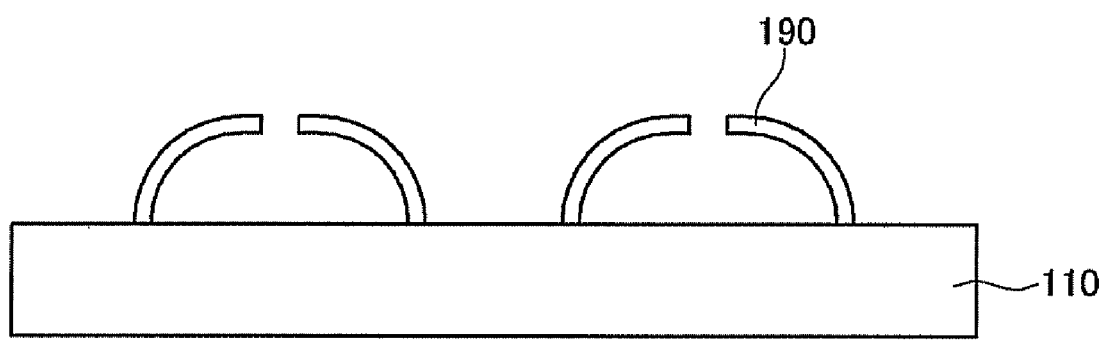

A polymer 310 is formed on a lower substrate 110 and patterned into a predetermined shape (see FIG. 11). While heat is applied to the polymer 310, a reflow process is performed such that the polymer 310 having a square shape is reformed into a polymer 315 having a round shape (see FIG. 12). An opaque metal layer is formed and then etched to the lower substrate 110 thereby forming microshutter electrodes 190 (see FIG. 13). The polymer 315 is selectively removed, thereby completing the lower substrate 110 (see FIG. 14). Since the polymer 315 has a different property from the microshutter electrodes 190, the polymer 315 can be selectively removed.

Though not shown in the drawings, wiring lines for applying signals to the microshutter electrodes 190 are formed on the lower substrate 110. It is preferable that the wiring lines be previously formed on the lower substrate 110 before a process in FIG. 11.

Hereinafter, a method of manufacturing an upper substrate will be described.

Figure 15:
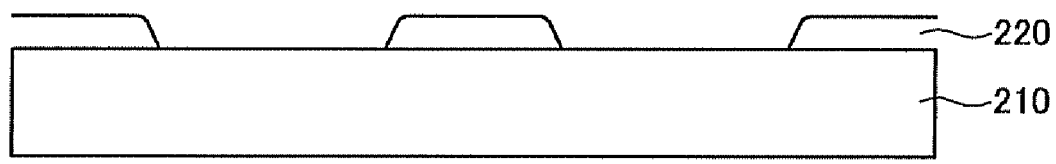
FIGS. 15 to 17 are sequential cross sectional views illustrating another exemplary method of manufacturing an upper substrate of a display device according to the present invention.
Figure 16:
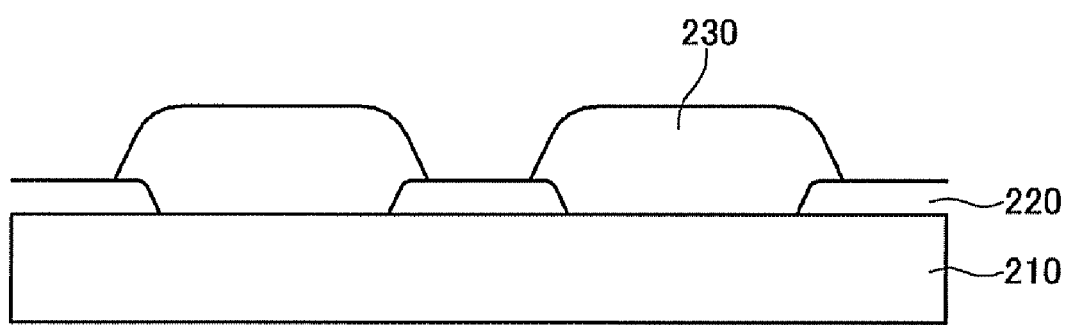
Figure 17:
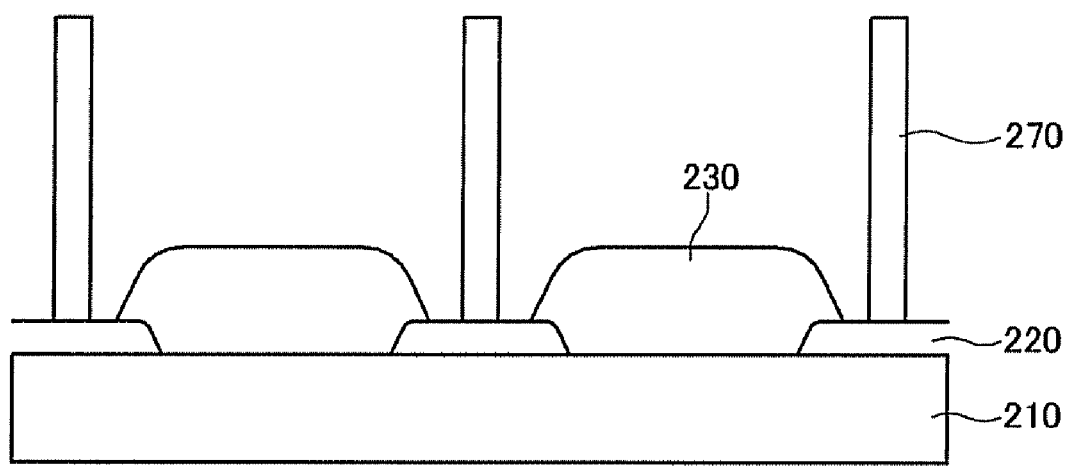

FIGS. 15 to 17 are views sequentially illustrating another exemplary method of manufacturing an upper substrate of a display device according to embodiment of the present invention.

A material capable of blocking light (e.g., chromium or the like) is deposited on the upper substrate 210 and then etched to the upper substrate 210 thereby forming black matrixes 220 (see FIG. 15). Then, color filters 230 are formed between the black matrixes (see FIG. 16). It is preferable that the color filters 230 be formed by different processes according to each color. The color filters having the same color may be formed in a column. Then, fixed electrodes 270 are formed on the black matrix by using metal (see FIG. 17).

Figure 18:
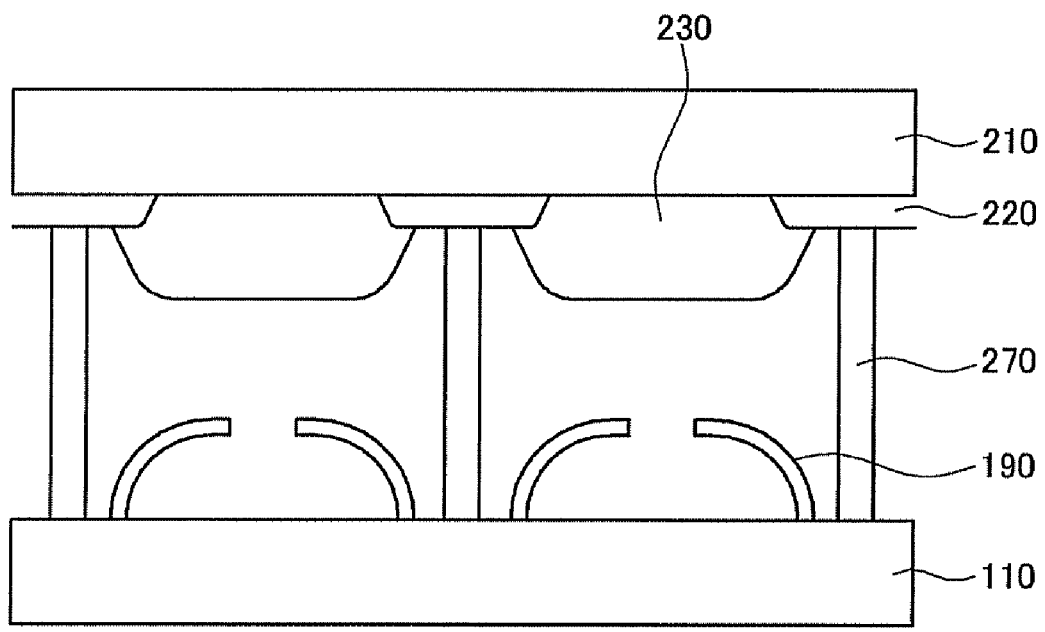
FIG. 18 is a cross sectional view showing an exemplary embodiment in which a lower substrate manufactured by processes shown in FIGS. 11 to 14 and an upper substrate manufactured by processes shown in FIGS. 15 to 17 are coupled to each other.

FIG. 18 is a view illustrating an exemplary embodiment in which a lower substrate manufactured by processes shown in FIGS. 11 to 14 is coupled to an upper substrate manufactured by processes shown in FIGS. 15 to 17.

When the lower substrate 110 manufactured by the processes shown in FIGS. 11 to 14 is coupled to the upper substrate 210 manufactured by the processes shown in FIGS. 15 to 17, a display panel is completed, as shown in FIG. 18.

In the display panel according to the present exemplary embodiment, unlike the exemplary embodiment shown in FIGS. 4 to 10, the fixed electrodes 270 are formed on the upper substrate 210.

Another exemplary embodiment of a display device according to the present invention may have a structure as follows.

Figure 19:
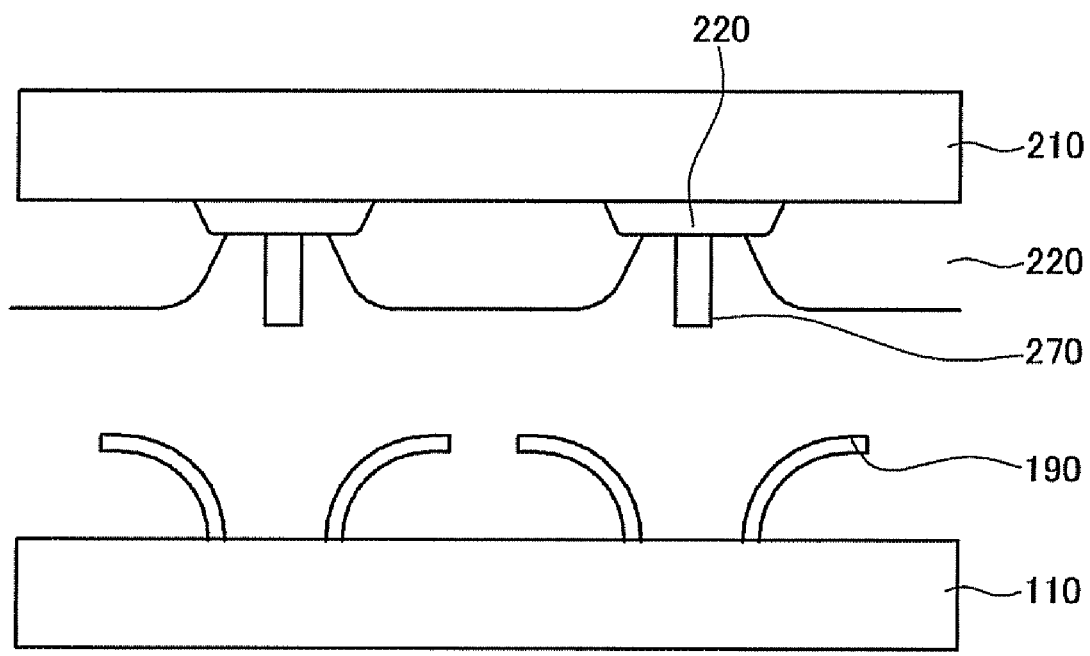
FIG. 19 is a cross-sectional view illustrating a second exemplary embodiment of a display device according to the present invention.

FIG. 19 is a cross-sectional view of the second exemplary embodiment of a display device according to the present invention.

Unlike the display device according to the exemplary embodiment shown in FIG. 1, the second exemplary embodiment of the display device includes the fixed electrodes 270 that are only in contact with the upper substrate 210, and have a small length; that is, they do not come in contact with the lower substrate 110.

Even when the fixed electrodes 270 have a small length as shown in FIG. 19, it is possible to adjust the opening and closing of the microshutter electrodes 190 by static electricity between the fixed electrodes 270 and the microshutter electrodes 190. However, since the fixed electrodes 270 are only in contact with the upper substrate 210, not with both the upper substrate 210 and the lower substrate 110, the fixed electrodes 270 cannot serve as spacers that maintain a predetermined thickness of the display panel. If necessary, spacers may be separately formed.

Figure 20:
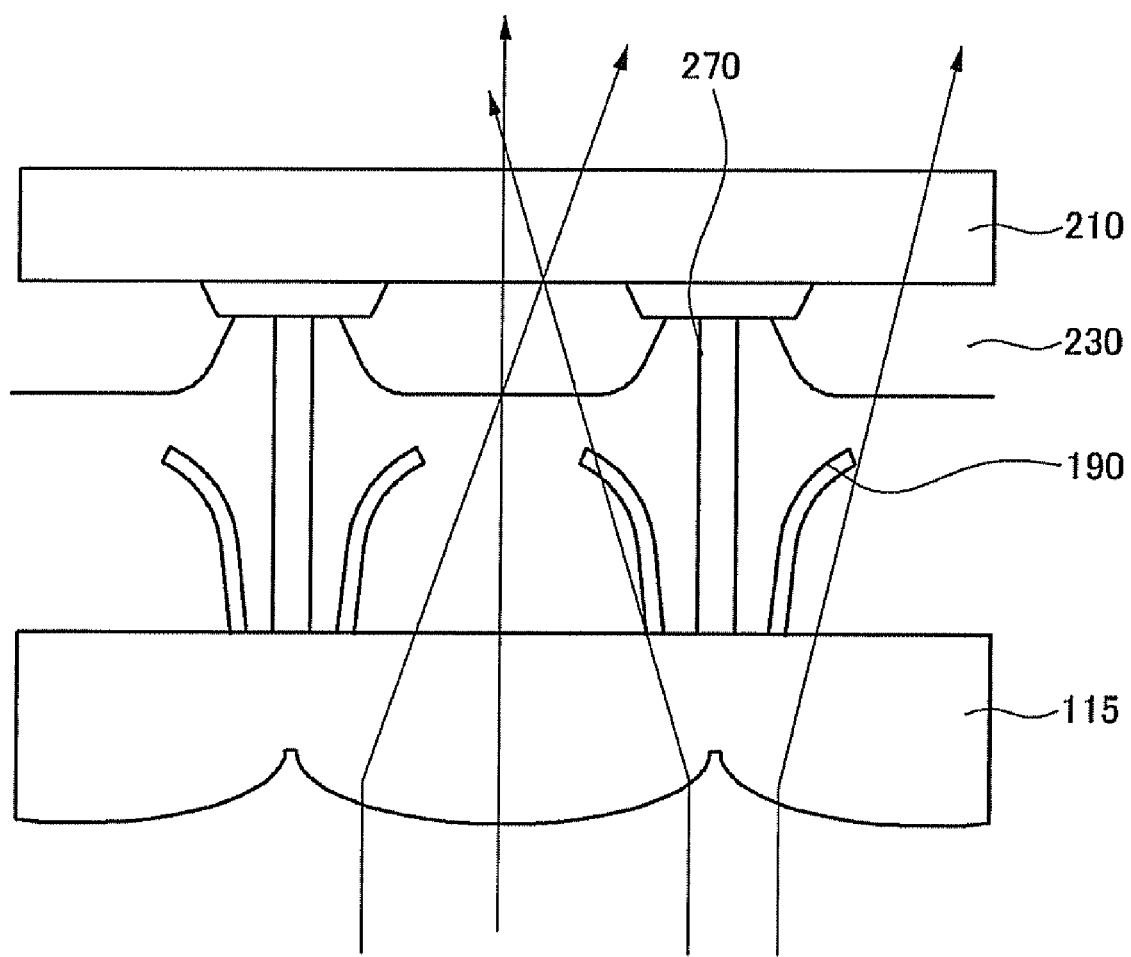
FIG. 20 is a cross-sectional view of a third exemplary embodiment of a display device according to the present invention.

FIG. 20 is a cross-sectional view of a third exemplary embodiment of a display device according to the present invention.

Unlike the exemplary embodiment in FIG. 1, a lower substrate 115 is formed in a lens shape on a lower surface thereof, as shown in FIG. 20. The lens shapes are formed by cutting cylinders and forming them in one direction. The lens shapes may be formed along the long sides of the pixels in the same way that the fixed electrodes 270 are formed along the long sides of the pixels. The lens shapes may be arranged between adjacent fixed electrodes 270. As shown in FIG. 20, the lens shapes may be formed with predetermined intervals therebetween. Alternatively, the lens shapes may be in contact with each other.

When the lens shapes are formed on the lower surface of the lower substrate 115, as shown in FIG. 20, light, which is incident on the fixed electrode 270, is blocked by the black matrix and thus is not used to display an image, and it may be refracted to be thus emitted to the outside, thereby improving luminance of the display device.

Figure 21:
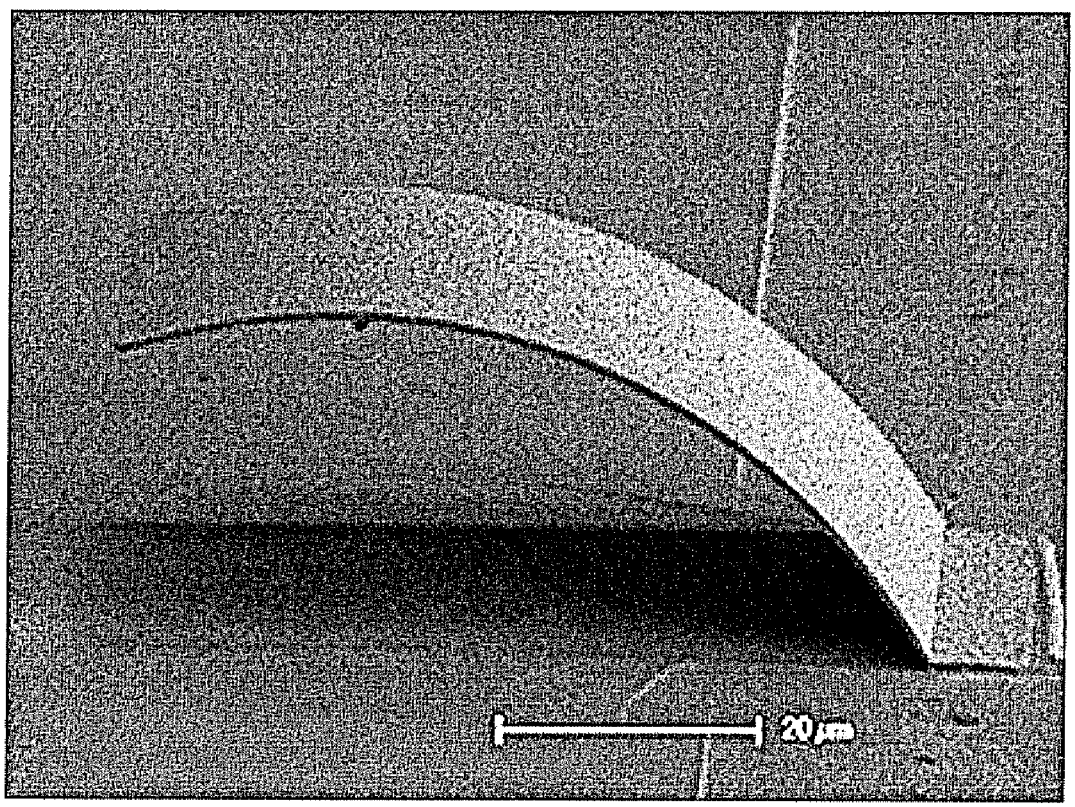
FIG. 21 is a perspective view showing an exemplary embodiment of a microshutter electrode according to the present invention.

FIG. 21 is a view showing an exemplary embodiment of a shape of a microshutter electrode according to the present invention.

As shown in FIG. 21, the microshutter electrode includes a curved surface that moves by static electricity and adjusts the amount of transmitted light.

As described above, an image can be displayed by using the microshutter electrodes and the fixed electrodes and adjusting the amount of transmitted light while the microshutter electrodes are opened and closed by static electricity. Further, since the fixed electrodes may be used as spacers, there is no need to separately form spacers. The lower substrate is formed with a lens shape on the lower surface thereof, such that luminance of the display device may be increased.

When the microshutter electrodes are used, polarizers are not used and thus the amount of light being transmitted is increased as compared with the known LCDs. Therefore, the overall luminance of the display device is increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   an upper substrate;
   a lower substrate;
   microshutter electrodes formed upon the lower substrate, the microshutter electrodes configured to open and close;
   fixed electrodes formed in a vertical direction between the upper substrate and the lower substrate;

black matrixes formed upon the upper substrate; and
color filters formed between the black matrixes,
wherein the microshutter electrodes are opened and closed in a vertical direction, and
wherein the fixed electrodes support the upper substrate and the lower substrate.

2. The display device of claim 1, wherein the fixed electrodes are formed in a region that is covered with the black matrixes.

3. The display device of claim 1, wherein two microshutter electrodes are symmetrically formed in one pixel and have a curved shape.

4. The display device of claim 3, wherein the two microshutter electrodes are arranged in a vertical direction to allow transmission of light from a light source to the upper substrate.

5. The display device of claim 3, wherein the two microshutter electrodes are in contact with each other to block the transmission of light from the light source to the upper substrate.

6. The display device of claim 3, wherein the two microshutter electrodes overlap each other to block the transmission of light from the light source to the upper substrate.

7. The display device of claim 3, wherein each of the microshutter electrodes extends upward from the lower substrate and curves at end portions thereof to face each other.

8. The display device of claim 1, wherein the fixed electrodes are formed on the black matrixes of the upper substrate and are not in contact with the lower substrate.

9. The display device of claim 1, further comprising a backlight unit that supplies light.

10. The display device of claim 1, wherein the lower substrate is formed in a convex lens shape on a lower surface thereof.

11. The display device of claim 10, wherein the convex lens shape is formed by cutting cylinders and arranging them in a direction in which the fixed electrodes are arranged.

12. A display device comprising:
an upper substrate;
a lower substrate;
microshutter electrodes formed upon the lower substrate, the microshutter electrodes configured to open and close;
fixed electrodes formed in a vertical direction between the upper substrate and the lower substrate; and
black matrixes formed upon the upper substrate,
wherein the microshutter electrodes are opened and closed in a vertical direction,
wherein the fixed electrodes support the upper substrate and the lower substrate, and
wherein the fixed electrodes are formed in a region that is covered with the black matrixes.

13. The display device of claim 12, wherein two microshutter electrodes are symmetrically formed in one pixel and have a curved shape.

14. The display device of claim 13, wherein the two microshutter electrodes are arranged in a vertical direction to allow transmission of light from a light source to the upper substrate,
wherein the two microshutter electrodes are in contact with each other to block the transmission of light from the light source to the upper substrate.

15. The display device of claim 12, wherein the fixed electrodes are formed on the black matrixes of the upper substrate and are not in contact with the lower substrate.

* * * * *